(12) United States Patent
Levneff et al.

(10) Patent No.: US 9,988,204 B1
(45) Date of Patent: Jun. 5, 2018

(54) STACKABLE PIZZA CONTAINER

(71) Applicants: Liya Levneff, Forest Hills, NY (US); Yuriy Leviyev, Forest Hills, NY (US)

(72) Inventors: Liya Levneff, Forest Hills, NY (US); Yuriy Leviyev, Forest Hills, NY (US)

( * ) Notice: Subject to any disclaimer, the term of this patent is extended or adjusted under 35 U.S.C. 154(b) by 0 days. days.

(21) Appl. No.: 15/447,477

(22) Filed: Mar. 2, 2017

(51) Int. Cl.
| | |
|---|---|
| *B65D 85/00* | (2006.01) |
| *B65D 81/34* | (2006.01) |
| *B65D 25/24* | (2006.01) |
| *B65D 43/16* | (2006.01) |
| *B65D 21/02* | (2006.01) |
| *B65D 25/04* | (2006.01) |
| *B65D 25/28* | (2006.01) |
| *A45C 11/20* | (2006.01) |

(52) U.S. Cl.
CPC ......... *B65D 85/70* (2013.01); *B65D 21/0209* (2013.01); *B65D 25/04* (2013.01); *B65D 25/24* (2013.01); *B65D 25/28* (2013.01); *B65D 43/16* (2013.01); *B65D 81/3453* (2013.01); *A45C 11/20* (2013.01)

(58) Field of Classification Search
CPC ............... B65D 85/70; B65D 21/0213; B65D 21/0209; B65D 21/02; B65D 21/022; B65D 25/04; B65D 25/24; B65D 25/28; B65D 43/16; B65D 81/3453; B65D 81/3446; B65D 81/34; B65D 1/40; B65D 1/36; B65D 1/34; B65D 51/16; B65D 21/0217–21/0224; A45C 11/20
USPC ...... 210/810, 4.27, 4.26, 675, 669, DIG. 13, 210/556, 555, 553; 206/512, 509, 504, 206/551, 511, 821; 426/128, 106; 220/810, 4.27, 4.26, 675, 669, DIG. 13, 220/556, 555, 553, 508
See application file for complete search history.

(56) References Cited

U.S. PATENT DOCUMENTS

| | | | | |
|---|---|---|---|---|
| 851,357 | A * | 4/1907 | Keefe ........................... | 206/551 |
| 1,597,566 | A * | 8/1926 | Bailey ..................... | A47J 47/14 206/551 |
| 4,736,861 | A * | 4/1988 | Basili ................. | B65D 21/0217 206/404 |
| 4,811,846 | A * | 3/1989 | Bottega .................... | B65D 1/34 206/542 |
| 5,080,225 | A * | 1/1992 | Russo ................ | A61B 10/0096 206/204 |
| 8,696,854 | B2 * | 4/2014 | van de Weijer .. | B29C 45/14811 156/212 |
| 2012/0024855 | A1 * | 2/2012 | Smyers .................... | B65D 1/34 220/324 |

* cited by examiner

*Primary Examiner* — Robert J Hicks
(74) *Attorney, Agent, or Firm* — Andrew S. Langsam; Pryor Cashmen LLP

(57) ABSTRACT

A food container for storing irregularly shaped preferably pie shaped foods having a central, inner cavity or compartment defined by a pie-shaped bottom surface, vertically extending side walls and a circumferential wall, along with a hinged top surface. The container may be built for further individual compartments or cavities and these may be stacked one on the other to separately store individual pieces of pie or pizza without one piece contacting another piece and, yet, storage space and footprint of the container is minimized, to advantage. A set of pie shaped cavities are provided for sliding receipt within a cabinet for food storage.

20 Claims, 6 Drawing Sheets

STACKABLE PIZZA CONTAINER

FIELD OF THE INVENTION

The present invention relates to a food container for irregularly, pie-shaped, or triangularly shaped foods such as slices of pizza or pie. For purposes of illustration only, the invention will most often be described in connection with pizza slices but it should be appreciated that other foods in similar shapes can be stored therein. Since many pizza slices are bought as a part of an overall pie and carried to home in a box, after partial consumption of some of the pie (even if the pie is baked at home) it is space consuming to refrigerate and store the remaining pizza pie slices in the original pizza pie carton or in flat, partial pie or spread out form within a refrigerator. The present invention relates to a convenient, space-efficient, pizza slice food container for refrigeration for later consumption of the food, likely first re-heating and then eating. The device allows the consumer to vertically stack the pie slices one on top of another, and, yet, the slices are not in contact with one another. That could result in the cheese of a first pie slice unintentionally becoming "merged," adhered, mixed or melted to the bottom of a second slice. The invention ensures that the topping of each slice is physically separated from the bottom of the slice above (and/or below) it. This avoids the cheese and/or sauce or other toppings of a first slice from sticking to the pie crust bottom of the adjacent and above slice. The present invention relates to a device which is meant to allow easy placement of one or more slices of a pizza or other pie shape foodstuff into a food storage container, all for placement and longer term storage for traveling, in a refrigerator (or on a kitchen countertop) or in the home freezer compartment. The invention is a convenient, hygienic, easy to use, space saver as the entire pie box or pie tin need not be used for storing only a single or a few slices. Rather, the container will "expand" vertically, slice upon slice as more than one slice is needed to be stored and contract, as desired, compartment by compartment, if desired, so that the pie slices are only held in provided compartments, and no more. So, according to the present invention, a single slice or many vertically stored slices will only occupy the "footprint" of the single slice in the refrigerator or on the kitchen countertop. Refrigerators have limited shelf space but they do possess vertical space which is often not taken up by a flat pizza. Using the present invention allows the pizza pie or other food, pie carton to be discarded and the residual slice(s) of the pie easily, quickly and space-savingly stored with minimum of wasted footprint in the refrigerator.

According to the preferred embodiment, the container is a pie slice-shaped cavity, three dimensional, preferably transparent, plastic container, with an internal cavity or compartment defined by a pie slice-shaped bottom surface, a similarly pie slice-shaped top surface, and vertically extending side walls and a circumferential wall, to elevate the top surface above the bottom surface (so that the slice can be placed therein without coming into contact with the underside of the top surface). The side walls meet at the tip of the container. A perimeter or circumferential wall, preferably curved but it could be straight, will extend between the top surface and the bottom surface to thereby define with the other pieces, a cavity for the food, preferably a pie-shape holding cavity for a slice of pizza. The container may be of any shape, but is preferably basically triangular (and preferably with a curved outer wall) to accommodate pizza or pie slices. They can be selectively slid into the container, between the top surface and the bottom surface, through one or more of the side walls and/or the perimeter wall. In an alternate embodiment the container is like a set of drawers, vertically stacked, such that individual slices are slid into the cavities of the drawers. Then, the wall(s) which was partially withdrawn or removed to allow for insertion of the pizza slice can be replaced, snapped or screwed in place, to define a three dimensional, pie-shaped, food container, ready for placement into a refrigerator or for travel or for simple countertop placement. Additional side walls and outside perimeter walls can be vertically stacked or connected, preferably at the pie-shaped center and the intersections of the side wall with the perimeter walls, and then another top surface (also pie shaped) secured thereon and thereto, all to build a pie shaped food container vertically, with two or more compartments vertically spaced, so that several pie slices can be simultaneously stored, one atop another, for future use/consumption.

Just as the outside perimeter wall is preferably a curve or arc shape, conforming to the outside surface of a pizza pie, but it can be "chord" shaped for the defined circle of the pie, the side walls may be any shape to hold the food, so long as enclosed compartment is ultimately defined. So, in lieu of straight radial-like vertical side walls, the side walls (still vertical) can have a fanciful scalloped edge. In any event, it is an important aspect of the present invention for the food holding container to be able to be expanded, vertically and contracted, too, as desired, so that one, two or more pie shaped slices of food can be stored, with the individual slices not coming into contract (top to adjacent bottom) to preserve the food. In the preferred embodiment there are two long, straight vertical side walls which meet at one of their ends (the pie's virtual center), and one outside, vertically extending, curved side or perimeter wall (corresponding to the outside or crust of a pizza or pie slice) provides a holding cavity for the foodstuff.

In an alternate embodiment, the outer or circumferential wall can be straight (extending as a chord across the virtual circle of the pizza pie) and not curved and extends between the other, non-contacting ends of the straight and vertical side walls of the container. The outside surface of the container (whether arc-shaped or curved or straight or even irregular is openable to allow easy access to the inside compartment for placement and removal of the pizza slice. A pie slice can be easily slid into and removed from the cavity of the container for consumption. Alternatively, a side vertical side wall can flip open (or the top, too, can be hinged and opened and closed) to expose the edge of the pizza slice for ease of removal of the same, just as the edge vertical wall can be open for placement of the pie slice in the cavity of the container.

In an alternate embodiment, the container is like a set of pie-shaped drawers where the outside, vertical surface, corresponding to the "crust" of the pizza pie, is provided with a handle and the cavities slide in and out with respect to the other "drawers" holding other pieces of the pie.

The top surfaces (a first top surface for a first slice becomes the holding layer or a bottom surface support for a second pizza slice) can be hinged about one of the long side walls or about the perimeter wall, to allow access from above or the side walls, either or both, can be simply hinged about their bottom edge(s) (where they come into contact with the bottom surface of the container) to allow side sliding of a pie slice into and out of the container.

Alternatively, the outside curved or straight vertical and circumference or perimeter wall can be hinged to the top or bottom surfaces of the container to allow access to the cavity from the side, outside or the perimeter edge of the container.

Preferably, a simple live plastic hinge or set of hinges can be used or other mechanisms may be used as well. In an alternate embodiment, a set of pie-slice shaped drawers are stacked, on sliders, to provide the multiple of compartments needed for individual storage of pie shaped foodstuffs. The compartments can be vertically stacked or removed as needed and each compartment is slidable, by pulling on the outside circumferential edge, with respect to the other compartments (held below) to gain access to that top compartment.

Further, the invention is easily capable of vertically expanding with the addition of pie-shaped bottom support surfaces to add to the storage space of the container, and, when its function is complete, the entire assembly can be deconstructed, simply, easily and quickly, for shelf or drawer storage (after washing). The ability to vertically stack the slices is highly desirable since horizontal shelf space is often a premium. The stackable container, i.e., a single container where two or more separated pie slice cavities are provided, will reduce the amount of shelf space, i.e., the square inches of shelf space required to store multiple slices.

To prevent the stacked individual pie-shaped compartments from shifting, the top and bottom surfaces of the container can have small holes or divits on their top and/or bottom faces. These holes accept support pegs, the pegs connecting and frictionally (screws or simple friction fit) locking into place one container now vertically spaced above another. Or, of course, the pegs need not be used and three pie-shaped pieces can be constructed into two pie-holding compartments, with the side and circumferential walls; a first top, pie-shaped piece for a first compartment becomes the bottom pie shaped piece of the top or a second compartment. It should be appreciated that three pie slice shapes when stacked will produce two separate cavities as the central stacked pie slice of plastic material will serve as the top surface for the first bottom cavity and the same pie shaped surface serves as the support or bottom surface of another cavity just above, for a second piece of pie. If the pegs and holding holes are used, each compartment has two pie-shaped pieces to form a compartment, the pegs serving to vertically space the compartments, one above the other.

The container preferably is of a material that may be heated, frozen, microwaved or washed in a dishwasher or hand-washed. In an alternative embodiment, the bottom pieces of the compartments can be a piece of plastic or foam which sandwiches a thin layer of metal, preferably aluminum, which when subjected to microwave, can re-heat a slice of pie for consumption at a temperature above that of the storage temperature.

BACKGROUND OF THE INVENTION

Irregularly shaped foods such as slices of pizza, pie, or cake are notoriously difficult to package and store. This is especially true if the entirety of the pie shape is not originally fully consumed. The left over pie shapes are desirably stored flat so that one piece does not merge into another and, yet, horizontal or shelf space for the footprint of the left overs is at a premium in most refrigerators. Clearly, there is a desire to store for future consumption the left over pie shaped food. Yet, to do so without consuming unnecessary shelf space is very desirable. Currently, the leftovers are placed on a plate (or a piece of aluminum foil) and the same placed into the refrigerator. That, however, uses significantly more shelf space than desired, especially if more than one pizza slice is to be stored for future use.

Due to their shapes, pie-shaped leftovers cannot easily nor efficiently be stored in a rectangular container. And, if a rectangular container is large enough to accommodate the slices, there is usually quite a bit of wasted cavity or container capacity, again at the expense of valuable horizontal shelf space in the refrigerator. To accommodate shapes such as slices of a circular pie, generally forming individual triangles or pie wedges, for example, a rectangular container much larger and of much more volume than the food item itself has been used. It is also desirable to avoid stacking the leftovers on top of one another as this allows the top of a below located piece to come into contact with the bottom of the piece located above it. That can ruin the topping. The use of a flat carton, however, wastes valuable space in a cabinet, refrigerator, or other location for storing food. Also, because food containers often are not intended to hold a large surface area of flat food, it is not uncommon for these food items to require a separate container for each piece, which requires even more storage space. As an alternative many consumers store these foods in foil or plastic wrap. And, if they are so stored, either a waste of foil is consumed to individually wrap the slices or the wrap extends around all of the flat slices, again to the disadvantage of the shelf space. And, if the pizza slices are stacked one upon the other within the plastic or foil wrap, the topping of a first slice will come into contact with the bottom of the above slice. This is undesirable. Further, triangular and other oddly shaped foods are difficult to cover with foil, either tin or aluminum, or plastic wraps—as the foods might not easily fit the width of the sheets or, even if they do, the sheets must be cut in rectangular increments which, like standard rectangular containers, cannot completely cover the item without leaving extra unused cavity space or wasted foil. Due to the shapes of these foods, multiple pieces of foil or wrap often must be used, wasting the foil or wrap and sometimes creating a clutter of material that can be difficult to unwrap. Even further, the excess foil or wrap caused by the rectangular sheets or multiple layers often create an irregular shape themselves, particularly on the top surface, which makes stacking multiple items in storage extremely difficult and require more space yet again.

There remains a need to package irregularly shaped foods, such as those that are triangular or pizza pie slice shapes, in a space efficient manner which can be vertically stacked with the slices individually maintained. The present invention is a basic triangular container with a rounded (or straight chord) back or perimeter/circumferential outer wall to accommodate triangular foods cuts from an original circular dish. The container can be reheated or frozen to simplify storing and heating. The food can be easily placed into the individual pie-shaped piece holding cavity(ies) and then removed, individually, as desired. The invention also includes some mechanism to allow for vertically extending the container for storage of individual pieces. In the preferred embodiment, additional slice-shaped pieces are provided which accept vertical pegs which are held in small holes in the top surfaces of the pie piece separators. This spaces and stacks the cavities. This allows the pie-shaped cavities of the container to conveniently vertically expand or stack on top of one another and to be collapsed in size, if fewer pie slices are needed to be stored or as pieces are consumed. This will securely, quickly, easily allow for multiple slices to be stored without the risk of individual slices shifting or falling over one another. This saves considerable shelf space in a refrigerator, freezer, or cabinet.

The inventors are aware of large storage containers for long term storage of cakes, and other odd shaped foodstuffs.

There is not believed, in the prior art, to be any food container which occupies a minimum of shelf space when only one pizza shaped slice is to be stored and, yet, can be vertically extended, as needed, to store two or more pizza-shaped slices of food. The present invention accomplishes this and other important advantages while ensuring that the slices are physically separated from one another during storage.

Also, current reheating of pizza pie slices or other foodstuffs require removal of the slice from the container or wrapper. The present invention contemplates the use of a bottom slice-shaped holder which is formed of a sandwich of material with a thin layer of metal or aluminum which, in a microwave, can reheat the slice for consumption.

SUMMARY OF THE INVENTION

The present invention relates to a container for food having a triangular or other shape intended to store for later consumption irregularly shaped foods such as pizza slices, pie slices, or specialized desserts. These foods can be difficult to store due to their shape and often require more horizontal space and more materials, such as foil or plastic wrap, to store the foods than those that are associated with more traditional shapes. Before the present invention, there seemed to be a waste of foil or other protective wrap when currently seeking to individually store pizza shaped slices.

The invention in its general form is a closable food holder, preferably a stackable plastic container having a basic first triangular or pie-shaped (outside edge either curved or straight) bottom piece. All components are intended to be refrigerable, heatable, freezable, and dishwasher safe. The materials are meant to be substantially inert to the foodstuff being stored although, in one embodiment, the food can be heated by a layer in the bottom surface of the container. Tupperware® or Pyrex® glass containers with silicone locking lids serving as food storage products are likely the closest prior art in terms of the materials used for the current containers and pieces/components. And, today, some containers are made of borosilicate glass so that they can go from oven to freezer to microwave to table, etc.

The bottom or pie-shaped piece (necessarily supplied in at least two units) is made of a sturdy material to provide support to the food. Acceptable materials include plastic, Pyrex®, some glass, and some more recent microwavable materials capable of going from refrigerator to freezer to oven to table, etc.

A first bottom and pie shaped piece is vertically separated from a second such piece by vertically extending side walls and a vertically extending outside circumference or perimeter wall. This forms a cavity and compartment in the shape of a pie slice. The side walls are preferably made from the same material as the bottom pieces, although in the embodiment where the bottom piece is a sandwich layer with metal foil, the sides and the top are not identical to the bottom support member. The side walls extend vertically along the edges of the pie-shaped bottom piece as does the perimeter or circumferential wall. The side walls and circumferential wall, with two bottom pieces (each pie shaped) one above the other, define the food container and the cavity for the pie-shaped article of food. The two "bottom" pieces (one serving as the top of the compartment, forming a single cavity for a pizza slice can be identical and the pizza slice thus slidable into and out of the cavity formed therebetween through one side wall (connected via a live hinge) or through the outside circumferential wall, when flipped open. Alternatively, the bottom piece is the full pizza slice size and shape and the top piece is slightly different, i.e., made of a slightly smaller pizza slice size. In this embodiment, the top piece is provided with a circular or arc-shaped segment extending from top edge of one side wall to opposed top edge of the other side wall, and having an outside circumferential edge which mates with the top edge of the outside, vertically extending circumferential wall. The arc-shaped segment can be hinged to allow for access to the cavity and/or the smaller, pie-shaped top piece can be hinged to the vertical side walls. A finger ledge or tab, extending outwardly from the top piece, can be provided to facilitate the opening and closing of the cavity about the hinge. In an alternate embodiment of the invention, the top piece is not itself integrated with a pizza pie central point but, rather, a small pointed segment is provided at the point of the container, extending between the vertical side walls. It will remain fixed to the vertical side walls even when the top piece is hingedly opened and the pizza slice slid into or placed into the cavity or removed.

In an alternate embodiment of the invention, the cavities are vertically stacked, like a set of triangularly shaped drawers, with each drawer capable of being slid out with respect to the other drawers, to allow access to that drawer. Each drawer is slideable on a set of bottom slides. Each drawer can be provided with a simple handle, on the outside circumferential wall, The drawers are vertically stacked and provide individually separated, pie-shaped drawers for food storage.

In some embodiments of the present invention, a layer of foil is integrated or sandwiched between two partial layers of the bottom pieces to aid in reheating the contents of the container as in a microwave, as described in U.S. Pat. No. 8,696,854.

In one embodiment of the invention, the top and bottom pieces are provided with small holes at or near their edges. They serve both as air weep holes for facilitating microwaving of the food contents and for receipt of simple pegs which allow the building of vertically stacked pizza pie slice containers, with each container slightly vertically separated by the pegs from adjacent food cavities.

A first simple pie-shaped bottom piece is surrounded by three vertical side walls (two of which are "radial" extending walls along the edge of the pie shape and one is a vertically extending side wall for the perimeter or circumferential side wall. The side and circumferential walls extend around the pie-shaped bottom piece to connect the perimeter of the pie-shaped container. The side walls and the circumferential wall are connected perpendicularly to each edge of the bottom piece/triangle and thus define a pie-shaped holding cavity or container.

A second pie shaped "bottom" piece (now serving as the top of the first cavity) is then connected to the top edges of the side walls and the circumferential or outside perimeter wall. It can "finish" the container or its top surface can become the supporting bottom surface for another pizza slice-holding cavity or container. Pie shaped cavities can thus be constructed, vertically spaced, depending on the number of slices of pizza or pie desirably stored in the container. Simply stated, the number of slices to be stored requires that plus one number of pie shaped, bottom pieces. So, storage of a single pie slice requires two "bottom" pie-shaped pieces—one above the other, while storage of two slices requires 3 bottom, pie-shaped pieces. Four slices desirably vertically stored require five bottom, pie-shaped pieces. Each bottom piece in between the bottom most and the top most of the constructed container serves as the top surface of a first, below-located cavity and the bottom surface for a pie slice supporting surface of a cavity above it.

Each bottom pie-shaped piece requires a pair of vertically extending side walls and a perimeter, also vertically extending circumferential wall. They, when secured to the pie-shaped, bottom surface, define the food holding cavity, to be sealed from above by another of the bottom, pie shaped surfaces.

Of course, the number of side walls can vary depending on the precise shape of the bottom piece and their lengths. A side of the bottom surface of the container can have two or more side wall segments. The side walls may be connected to the edges of the bottom piece(s) by any mechanical or connecting means including fusing, gluing, live hinges, physical hinges, etc. The pie shaped bottom (and top) pieces are generally about 6-12 inches on a side, preferably about 8 inches to accommodate a pizza pie having a diameter of about 16 inches. Smaller or larger pie slices can be accommodated by smaller and larger bottom pieces. The side walls are preferably one to two inches high (to provide a container or cavity of about that vertical space) although a wide range of heights are possible. The invention also includes at least one additional bottom piece (than the number of slices to be stored) to serve as a top piece that is the same size and shape as the first bottom piece and rests on its edges on the top edges of the vertical side walls and the circumferential piece. These pieces, when constructed, form at least one food holding cavity and when several bottom pieces are stacked and separated from one another (by the side walls and the circumferential wall) a single, integrated container with multiple and vertically separated, food storage cavities results for pie-shaped pieces of food. A hollow food container with a substantially sealed set of internal compartments for irregular and preferably odd-shaped food is provided. Vertical stacking of cavities allows for several pieces of odd or pie shaped foods to be stored without wasting of shelf space.

Preferably, on the top and bottom surfaces of each of the separate bottom pieces or sections is a small, preferably cylindrical, weep hole or internal screw-threaded aperture for receiving vertically separating and structurally securing pegs. This will physically further space each compartment from a vertically adjacent compartment.

In an alternate embodiment, a set of pie-slice shaped drawers are provided, one above the other, with each drawer capable of sliding out of its holding frame to allow for the insertion and removal of a pie slice. The drawers are slideable upon a set of slides, located on the bottom of the bottom pieces, along the radial edges of the pie slice-shaped drawers.

In one embodiment, the remainder of the top surface of the bottom, pie-shaped piece is an openable section providing access to the cavity. This can be in the form of a lid section, or a part or all of the side walls can be hingedly attached to one edge of the bottom piece so that it may rotate open, allowing access to the interior compartment or cavity. Other forms of opening the lid are possible. The bottom surface (on top of a cavity) can be slid off, can be rotatable about the below-located side walls or the perimeter wall, etc.

The invention also includes stabilizing pegs (made from the same inexpensive yet sturdy material as the bottom pieces and the side and circumferential walls) that secure to and allow the creation of two or more vertically stacked cavities or containers, one on top of the other. The pegs have small cylindrical protrusions which fit into (threadably or frictionally) the holes or apertures in the bottom surfaces. This allows individual cavaties to be stacked one above the other, by the separating pegs physically spacing the top of a first cavity from the bottom of the above located second cavity This enables the space-efficient storage of pie-shaped foods in stacks, which saves space in cabinets, refrigerators, or freezers. Preferably, the pegs have a small cylindrical central base with two smaller diameter pins projecting from opposite ends. The pins can be but likely need not be screw threaded for mating with threaded bores in the corners of the top surface of the bottom pieces. The pins can be frictionally held, too. The cylindrical pin of one end of a peg is secured in the hole of the top surface of the bottom piece and the pin at the other end of the same peg is secured in a hole on the bottom surface of a second bottom piece, which is suspended and thereby placed to cause the cavities to align one directly above the other. Of course, the exact placement of the holes may vary somewhat to be placed nearly anywhere on the top or bottom surfaces of the bottom pieces but in the preferred embodiment, they are positioned on or near meeting points or corners of the container. The holes are about the same size as the pins of the pegs and preferably only slightly larger dimensions such that the pin fits snugly inside of and is frictionally held in place in the hole or is screw threaded therein. A set of pie-shaped cavities is thus capable of being constructed for individually holding multiple pie-shaped foods, one above the other. The entire device can be built in seconds to accommodate the number of slices to be stored and can, just as easily, be taken apart for washing and drawer storage or as slices are individually consumed.

DETAILED DESCRIPTION OF THE DRAWINGS AND THE PREFERRED EMBODIMENTS

Figure 1:
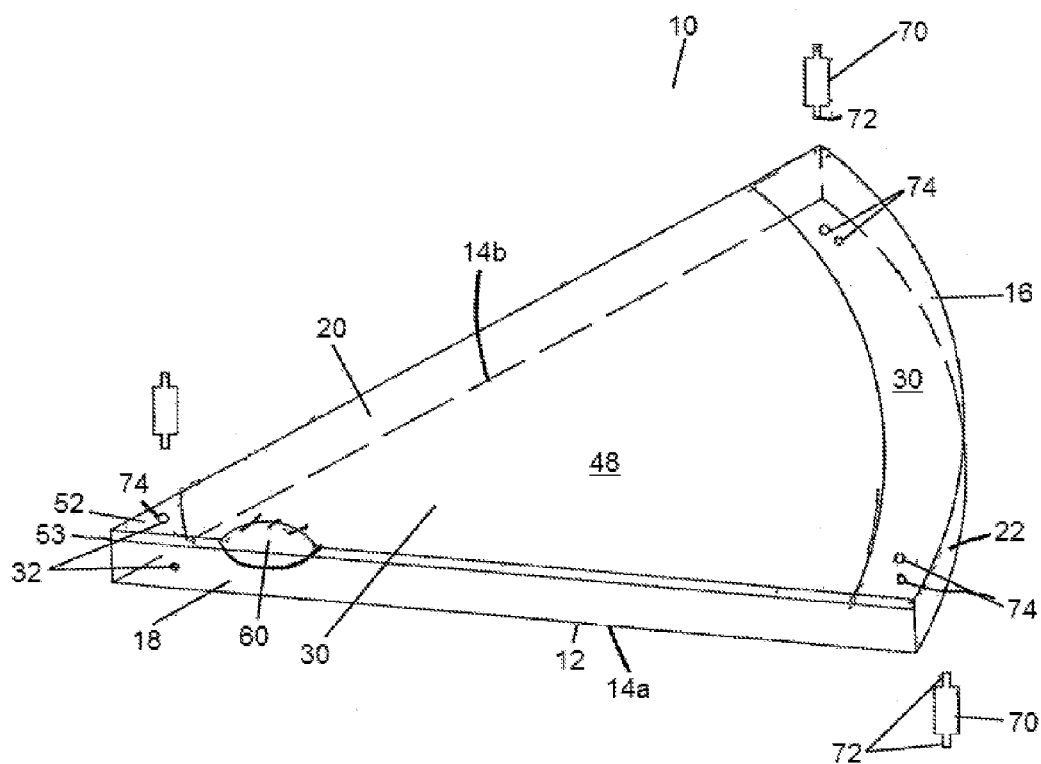
FIG. 1 is a perspective, top view of the invention showing a pizza slice holding cavity (without food) in the closed position and showing in exploded form, the vertically separating pegs for allowing stacking of pie-shaped cavities to form a stacked integrated container.

The present invention is a basically pie shaped or triangular food compartment 10 for storing pizza and other similarly shaped foods such as pie and cake. The basic cavity for holding the food is generally seen in FIG. 1. Multiple slices are to be held in vertically stackable cavities with the number of components required for a complete food storage container being basically determined as follows: So called Bottom Surfaces: One more than the number of slices to be stored (in the embodiment where the top and bottom of a cavity are identical) and suitable side walls (2 per a first of the bottom surfaces) and a single perimeter or circumferential wall for separating the bottom surfaces. Thus, a single pizza slice holding cavity or food compartment 10 will comprise 5 plastic pieces, two bottom surfaces, two radially extending, vertical side walls, and a single outside circumferential wall, also extending vertically to the bottom but, here, to the outside edge of the bottom. In another embodiment, the top and the bottom pieces are not identical and, thus the top piece is formed of a large pizza slice shape (but slightly smaller than the bottom), with a small pointed section and a circular, arc-segment (as shown in FIG. 1).

The holding compartment is composed of a pie-shaped first bottom surface 12, sized and shaped to accommodate the intended food. In the preferred embodiment in which the container stores a slice of pizza, the bottom surface 12 is a straight walled or three sided triangle shape with an outside straight wall or with an outside curved edge (as shown in FIG. 1 and more like a pizza slice) roughly ten or twelve inches in pie radius and six to eight or even ten inches for the outside, perimeter or circumferential edge. Of course, other dimensions are possible. The bottom surface is preferably made of an inert-to-food material, capable of being refrigerated, frozen, popped into an oven or microwave and then still cool-to the touch material. Preferably, each bottom surface 12 is made of two long and identically sized radial edges 14a and 14b with one shorter outside, perimeter, circumferential edge 16 (whether straight or curved). As mentioned the bottom surface 12 thus forms a triangle or a triangle with an outside curved edge, as a pizza pie shape. Preferably, the pie shape subtends about 60 degrees or is a one-sixth of the full pie, but, one eighth pie (about 45 degrees) shapes are possible, too. As many basically triangle shaped foods such as pizza, cake, and pie, begin as pieces of a larger circular dish, and have a curved outside edge, the preferred perimeter or outside circumferential edge embodiment is curved. The bottom surfaces 12 may be made of a number of materials, including plastic, borosilicate glass, Pyrex®, tempered glass, rubber, silicone, or any other suitable compositions, even possibly of stiff cardboard.

In preferred embodiments, the bottom surface 12 may include a piece of thin metal or aluminum foil sandwiched or integrated between plastic or glass or rubber sheets as described in U.S. Pat. No. 8,696,854 to aid in the reheating process of the food in a microwave oven. The bottom surface 12 is the support surface for a first piece of the food sought to be stored. It is provided with vertically extending side walls 18 and 20, mating and extending about its two opposed edges, side edges 14a and 14b. The preferred embodiment for storing pizza has two vertical side walls 18 and 20 as the container is triangular and then a circumferential straight or curved vertical wall 22. Two of the vertical side edges 14a and 14b extend from the tip of the triangularly shaped bottom 12 to the opposite or distal points of the bottom piece. Those side wall edges 14a and 14b are bounded by vertical side walls 18 and 20. The third side edge 16 has a vertical, circumferential wall extending to and from the distal points of the radial side walls 14a and 14b of the bottom piece 12. That piece, the outside or perimeter/circumferential side wall 22 is either straight to conform to the straight edge of the bottom piece 12 or curved to conform to a curved outside edge 16 (conforming to the curve of the the crust of a slice of pizza) of the bottom piece 12. The side walls 18 and 20, and circumferential side wall 22 stand preferably perpendicularly at ninety degrees from the bottom piece or surface 12. They may be connected to the bottom surface 12 by any means desired including by glue, physical hinge, or live hinge (similar to the hinging of closing tabs on plastic covers for conventional glass-like food containers).

The side edges 14a, 14b and 16 and their vertical side walls 18, 20 and 22, respectively, extend around and span the entire perimeter of the bottom piece surface 12 so that no edge is uncovered and the cavity formed by the bottom 12 and side walls 18, 20 and 22, is substantially "air tight" when a cover is placed on the top edges of the vertical side walls 18, 20 and 22. Further, the edges of the vertical walls, at their ends, are joined to one another as well to close off the container and to form a holding cavity for the pie-shaped food. The bottom surface 12 and edges 14a, 14b, and 16, with vertical walls 18, 20 and 22 thus form a pie-shaped dish-like, basically triangularly (or with a curved outside wall, a pizza pie slice shape) cavity in which the food can be placed and when suitably sealed with another bottom piece 12 (sitting atop as a cover 30 (see FIGS. 1 and 2), a container for the storage of food is provided. Placement of a top 30 (substantially an identical and thus second bottom 12) on the top edges of the vertical side walls 18, 20 and 22 in the same size as the bottom 12 provides a pie-shaped enclosure or cavity for a slice of pizza. The edges of the bottoms (12 and 30) and the top and bottom edges as well as the side edges of vertical side walls 18, 20 and 22 can be chamfered to mate with one another. This also prevents air leaks from and to the stored food while preventing liquids from entering the container as well. A basic food container in the shape of a single pie slice is thus provided.

The device requires a mechanism to close it off after a piece of food is placed therein and to allow access thereto, to remove the food, as desired. This can be in the form of a simple second bottom 30 which slides on and off the top edges of the vertical walls 18, 20 and 22, or the top (second bottom 30) can be hinged to one of the vertical side walls 18, 20 or the circumferential wall 22. As mentioned, the preferred embodiment also includes a second bottom piece 12, acting as a top surface 30, for the first cavity, constructed to seal the entire contents of the container from the outside elements. Preferably, it, too, is shaped, triangularly and/or with a curved outside edge, and sized to generally match the size and shape of the first bottom piece 12. This second bottom piece 30, acting as a top surface to close off the cavity for the food, rests on top of the edges of the side walls 18, 20 and 22. This way, the complete container, a first bottom piece 12 acting as a food support surface, side walls 18 and 20, and outside wall 22, and a second bottom piece 12 (referred to in FIG. 1 as element 30) form a sealable container with a basic triangle-shaped cavity for protecting a food substance in the shape of a pie slice. The top side 32 of the first bottom piece 12 supports from below the piece of pizza pie (not shown) and the bottom side or surface 34 of the second bottom piece 30, supported above the first bottom piece 12 by the side walls 18, 20 and 22, seals the cavity 20 of the container. That bottom side 34 of the second bottom piece 12 or 30 is preferably suspended above the slice of pie (pizza or other food) held within the cavity. The outside edges of the container are sealed by the vertical walls 18, 20 and 22 being held to the edges of the bottom 12 and the edges of the second bottom 12 (referred to as element 30 in FIG. 1). This provides a first container for pie shaped slices of food.

If more than one slice of pie is desirably stored, it should be appreciated that another "bottom" 12 can be supported above the second bottom 12 (serving as a top 30) of the first cavity. Another or second set of vertical walls 18, 20 and 22 can be placed around the edges 36, 38 and 40 of the second bottom 12 (a top 30 of the first cavity) and that with yet another bottom 12 (the third identically shaped piece) will sit atop the edges of those walls 36, 38 and 40 and thus will form and complete a second pie-shaped cavity for yet another slice of food. In this manner, by using bottoms 12 and vertical side walls 18 and 20 (and second and more sets of the same) and circumferential walls 22, s series of vertically stacked pie-shaped food containers is provided, where the footprint of the food container is no more than the footprint of a single food—holding cavity.

Figure 2:
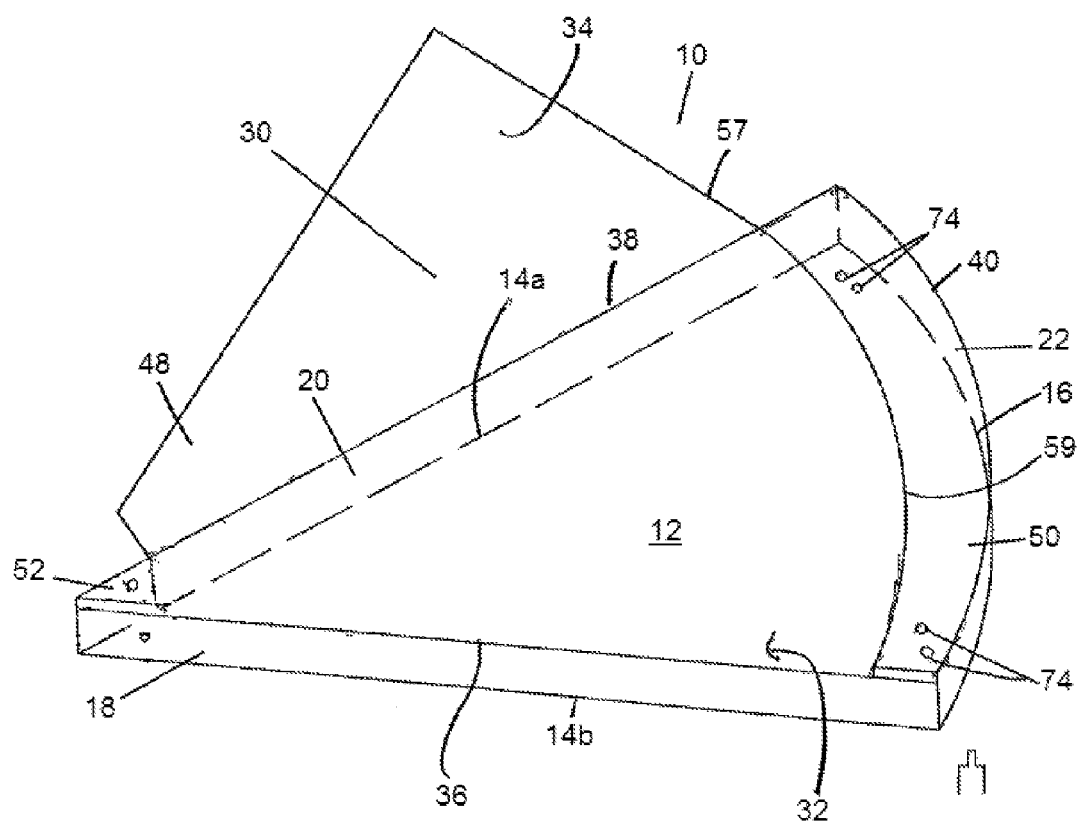
FIG. 2 is a perspective, top view of the container with the top piece hinged to the open position and exposing access to the food-holding cavity.
Figure 3:
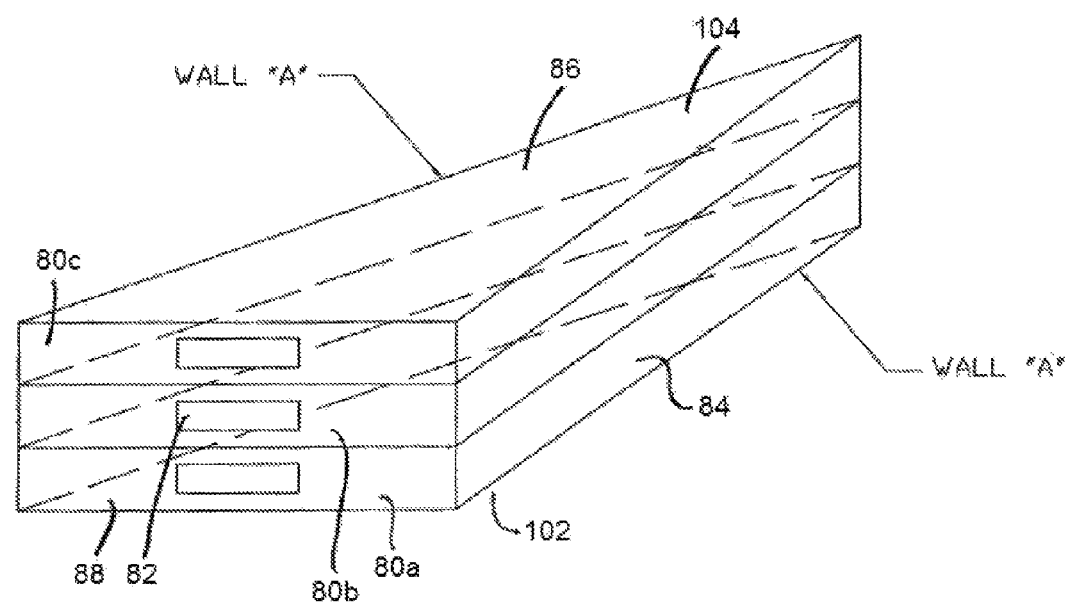
FIG. 3 is a side perspective view of another embodiment of the invention, showing a set of three drawers, in pie shapes, vertically stacked and showing the handles for opening and closing the same.
Figure 4:
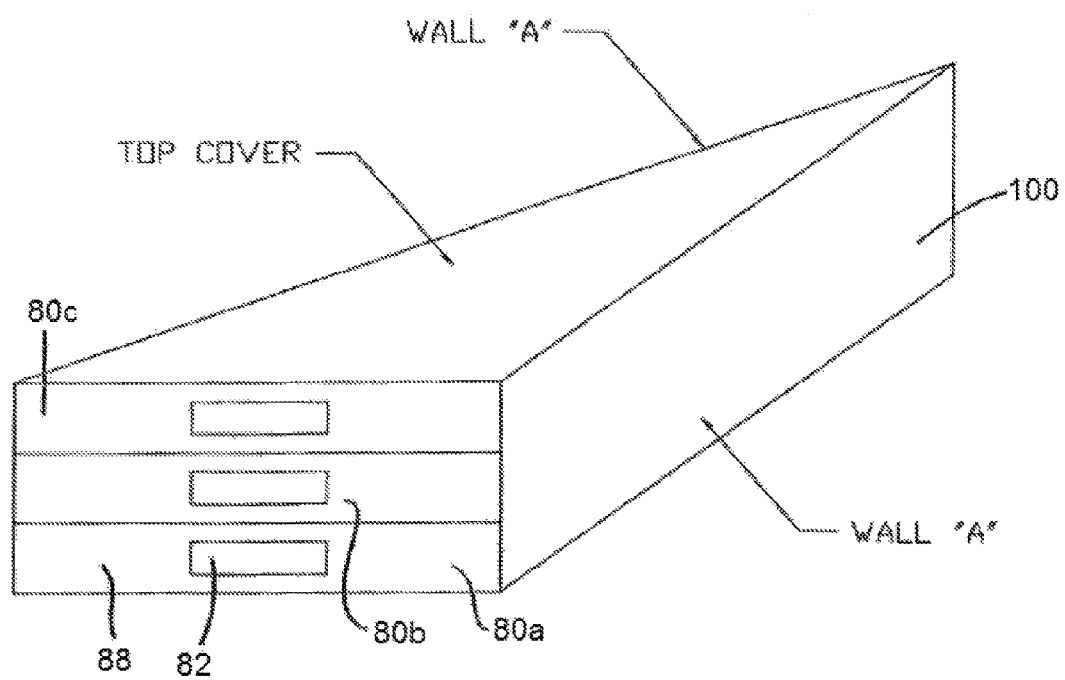
FIG. 4 is a side perspective view of the drawer cabinet holding the three drawers of FIG. 3.
Figure 5:
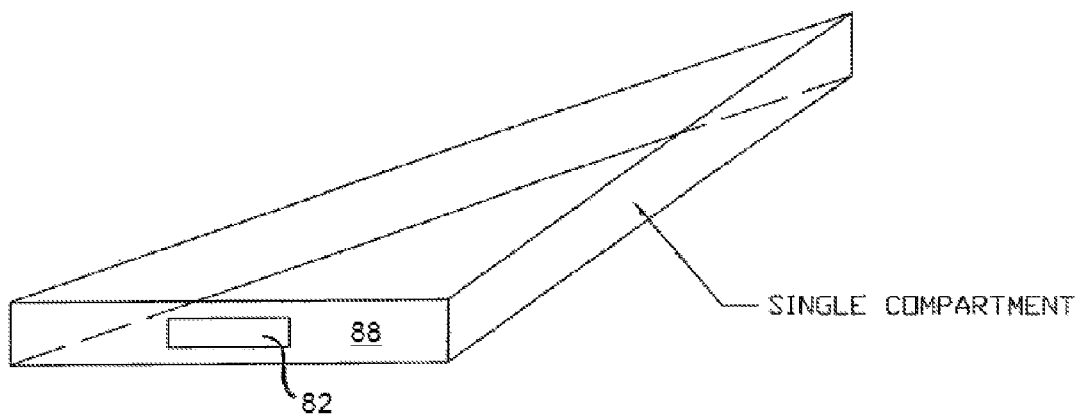
FIG. 5 is a side perspective view of a single drawer of the embodiment of the slice container shown in FIGS. 3 and 4.
Figure 6:
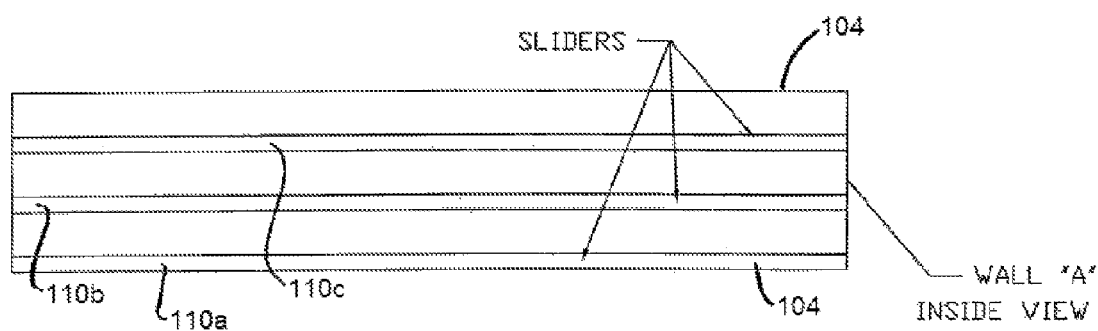
FIG. 6 is a side view of the stacked drawers inside of the container of FIG. 4, i.e., a side view of the drawers shown in FIG. 3.

As mentioned, the top of the cavity can be identical to the bottom of the compartment and can be lifted off of the top edges of the side walls to gain access to the compartment. Alternatively, the top 30 can be hinged to the vertical side wall. In an alternate embodiment, a bottom piece 12 is substantially triangularly shaped for the cavity/food container floor but a different top piece shape 30 is provided. That is shown in FIGS. 1 and 2. A top piece 30 is provided with a first, large pie-shaped section 48 and a circumferential segmented portion 50, which together form the same basic size as the pie-shaped bottom 12. Actually, however, a small triangular tip piece 52 is provided, in one embodiment so that the tip piece 52, mates with a small edge of the large section 48. The segmented portion 30, the large pie-shaped section 48 and the tip piece 52 together, are about the same overall shape and size as the bottom 12. The tip piece 52 sits atop the edges of the side walls 18 and 20. A small curved segment 54 of the large section 48 mates with the edge 56 of the tip piece 50 opposite to the actual tip 53. The outside circumferential edge 57 of the large pie-shaped section 48 mates with the edge 59 of the circumferential segmented portion 50, while the outside edge of the circumferential segmented portion 50 will side atop the circumferential, vertical wall 22. Together, the tip piece 52, the large pie-shaped section 48 and the circumferential segmented portion 50 are the size and shape as the bottom 12. Yet, according to this embodiment, the side walls 18 and 20 and outside wall 22 can be hinged to the bottom 12 (about the edges 14a, 14b and 16) or to any mating edge of the top to allow access to the cavity. Or, the large pie-shaped section 48 can be hinged to one of the top edges of the side walls 18 and 20 (or removed therefrom) to allow access to the cavity. Again, the top edges and bottom edges of the elements can be chamfered to mate with one another for support and ease of sliding movement, when desired.

On one side of one of the long edges of the large pie shaped section 48 (See FIG. 1) a finger ledge or tab 60 can be provided which allows a finger of a user to get beneath to easily and quickly open the top of the cavity, by opening the top 30, i.e., to help raise the same about the hinge between top 30 and the vertical side wall 20, to which it is hingedly attached, to provide ease of access to the cavity.

The second bottom surface 12 (identical to first bottom surface 12) or the top 30 made up of the tip 52, the large pie shaped section 48 and the circumferential segmented portion 30 are secured to the top edges of the side walls 14a, 14b, and 16, by any means desired by the manufacturer including a live hinge, a set of mating grooves with protruding lips captured in the groove, interlocking lip or tabs, etc.

The openable top or cover (formed by the second bottom piece 12 or the combination of tip 52, large pie piece 48 and circumferential segmented portion 50) are attached on one or more side edges to one or more of the top edges of side walls 18, 20 and 22. Preferably a hinge (live hinge) is provided enabling the large pie piece component 48 to rotate about the hinge above and away from the cavity of the container (as in FIG. 2) and then return to its original closing position as seen in FIG. 1. Opening the container allows a user to access its contents including the pizza slice that may be stored within, to either place the pizza slice inside of the container or to remove it. As suggested above, the openable top or cover 30 for the cavity preferably also includes a small finger tab 60 on its edge opposite the side of the hinge that allows a user to easily grasp the same to open and close the cavity. The finger tab extends outwardly and co-planar to the top 30 of the cavity.

The invention is stackable so that a user may save space when storing food in areas of limited space, such a refrigerator or a freezer, by placing the food items on top of each other in separate cavities formed by stacked bottom pieces vertically separated by side walls 18, 20 and 22. Three bottom pieces 12 can form 2 fully contained food cavities, supported by a single lowermost bottom piece 12 as the "footprint." This is truly space saving horizontally (for preserving shelf space) and vertically in that the device is only built with sufficient bottom pieces 12 to store the required storable food slices, not more. Traditionally, users will store left over pizza, for example, in the pizza box in the refrigerator. Due to the circular shape of the pizza and square shape of the box, the pizza box takes up considerable space, although individual slices are relatively small and thin. Even more, if only a portion of the pizza pie is left and stored in the refrigerator, storing the entire box requires making room for what is essentially empty space. Large areas of the box may not bear any food.

The present invention alternatively provides preferably plastic pegs 70 so that individual cavities, each formed with a top surface of a bottom piece 12 and the bottom surface of another bottom piece 12 can be vertically stacked. This results in the vertical spacing of the pizza slices, each in an individual container or cavity. A single composite container 10 can be made by using side walls, circumferential walls and bottom surfaces. The pegs 70 serve to provide a single structure which will reduce the tendency of the device to shift or fall. The pegs are preferably cylindrical in shape, with smaller diameter and shorter cylindrical pins 72 projecting from the top and bottom of the cylindrical peg 70. Other shapes and configurations of the pegs are possible. The pins of the pegs can be threaded or smooth cylindrical walls. The pegs are secured with a first pin being inserted and held into a corresponding bore or recess in the top surface of a first bottom piece 12 and the other or opposed pin 72 of the peg 70 being secured in the bottom surface of a second bottom piece 12, located above the first bottom piece 12. This will provide spaced bottom pieces, i.e., the pegs serve to allow air to circulate between the top of a bottom piece and the bottom of an adjacent but above bottom piece of the next-above cavity. Alternatively, the side walls 18 and 20 and circumferential wall 22 separate and support vertically stacked cavities or, stated differently, the top of a first cavity is the bottom of the above cavity. The surfaces of the bottom pieces 12 include at least three small holes, bores or recesses 74 sized and shaped to accept and hold the pins 72 within. Thus the bottom pieces, each with two surfaces, top and bottom, have holes 74 for the pins 72. The pegs 70 thus separate two cavities one on top of the other by fitting into the holes or bores 74, one above on its bottom surface and one below on its top surface, and separating them by the width of the wider cylindrical center of the peg 70. The pegs further prevent the contents of the container from being compressed by the weight of additional cavities and contents stacked above as the pegs ensure a given distance between each cavity. Air flow is ensured by the separating pegs between vertically adjacent cavaties.

The container is preferably made from a material which can withstand cold temperatures such as plastics or borosilicate glass and hot temperatures (oven and microwave ovens, as well as dishwashers). Further embodiments may be made of materials that easily reheat and freeze such as borosilicate glass, plastic and rubber-based or silicone components. Even further embodiments may provide disposable variations of the invention. The bottom surface pieces and top surface pieces and the side walls and circumferential walls need not be made of the same material. And, as mentioned, the bottom pieces can be formed as a composite or sandwich with a thin sheet of metallic foil therebetween for facilitating the reheating of the food within the cavity.

In an alternate embodiment of the present invention, shown, for example, in FIGS. 3-6, three pie-shaped drawers 80a, 80b, and 80c, are stacked, one above the other. Each is provided with a front handle 82 to facilitate easy opening and closing of the drawer 80a,80b, or 80c within the cabinet 100. Each drawer is formed of a side wall 84, an opposed side wall 86 and a front wall 88. The walls are vertically secured to a wedge shaped bottom 102 and to a wedge shaped top 104. The walls and the bottom and top form a pie-shaped holding cavity which can slide into and out of the cabinet 100, when each drawer is pulled by handle 82. On the bottom outside edges of each drawer, sliders 110 are provided, small downwardly extending protrusions which allow each drawer to slide upon the drawer beneath it (or the bottom drawer to slide into and out of the cabinet 100. Sliders 110a, 110b, and 110c are shown as extending for the full length of the sides of each side wall 84 for each of the drawers 80a, 80b, and 80c, respectively.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A container for storing food comprised of:
a bottom defined by edges in the shape of a pie slice, a first set of vertically extending side walls including a circumferential side wall, the side walls all having bottom edges connected to edges of said bottom, and a first top of the same size and shape as said bottom to form a first food cavity in the shape of a pie slice;
said first top being hingedly secured to at least one of the top edges of any one of said side walls to present an openable lid capable of providing access to the food cavity; and
a set of additional side walls extending upwardly from said first set of side walls and a second top and bottom to complete a second food cavity in the shape of a pie slice, located above said first food cavity,
wherein said second cavity is vertically supported above said first cavity with an air gap therebetween by a set of supporting pegs which are held in the top of said first cavity and the bottom of said second cavity.

2. A container as claimed in claim 1 wherein said container is made of borosilicate glass.

3. A container as claimed in claim 1 wherein the bottom and top(s) are basically triangularly shaped with the outside edge being either straight or curved.

4. A container as claimed in claim 1 wherein said tops are hingedly connected to any one of said sides wall by a live hinge.

5. A container as claimed in claim 1 wherein said first top and/or said second top is comprised of a tip piece, a large pie shaped section and a segmented circumferential section.

6. A container as claimed in claim 1 wherein the edges of said side walls and/or said circumferential wall mate with one another.

7. A container as claimed in claim 6 wherein said walls mate with one another via chamfered edges.

8. A container as claimed in claim 1 wherein said first top and/or said second top is provided with a finger tab to facilitate hinged movement of said top about the top edges of said side walls and/or said circumferential wall.

9. A container as claimed in claim 1 further comprising a holding cabinet for two or more of said food cavities.

10. A container as claimed in claim 9 wherein said cavities are provided with slider elements for facilitating the sliding movement of a first of said cavities with respect to another of said cavities or said cabinet.

11. A container for storing food comprised of:
a bottom defined by edges in the shape of a pie slice, a first set of vertically extending side walls including a circumferential side wall, the side walls all having bottom edges connected to edges of said bottom, and a first top of the same size and shape as said bottom to form a first food cavity in the shape of a pie slice;
said first top being hingedly secured to at least one of the top edges of any one of said side walls to present an openable lid capable of providing access to the food cavity; and
a set of additional side walls extending upwardly from said first set of side walls and a second top and bottom to complete a second food cavity in the shape of a pie slice, located above said first food cavity,
wherein two or more of said cavities are suspended above one another and spaced vertically apart by supporting pegs to facilitate air flow.

12. A container as claimed in claim 11 wherein said pegs are threadedly captured to said top and bottoms of said cavities within bores passing therethrough.

13. A container as claimed in claim 12 wherein said bores, when not holding said pegs, serve to facilitate air passage during microwaving of the same.

14. A container as claimed in claim 11 wherein said container is made of borosilicate glass.

15. A container as claimed in claim 11 wherein the bottom and top(s) are basically triangularly shaped with the outside edge being either straight or curved.

16. A container as claimed in claim 11 wherein said tops are hingedly connected to any one of said sides wall by a live hinge.

17. A container as claimed in claim 11 wherein said first top and/or said second top is comprised of a tip piece, a large pie shaped section and a segmented circumferential section.

18. A container as claimed in claim 11 wherein the edges of said side walls and/or said circumferential wall mate with one another.

19. A container as claimed in claim 18 wherein said walls mate with one another via chamfered edges.

20. A container as claimed in claim 11 wherein said first top and/or said second top is provided with a finger tab to facilitate hinged movement of said top about the top edges of said side walls and/or said circumferential wall.

* * * * *